US 6,688,634 B2

(12) United States Patent  (10) Patent No.: US 6,688,634 B2
Noffsinger  (45) Date of Patent: Feb. 10, 2004

(54) FOLDABLE TOOL CART

(76) Inventor: Alfred Ace Noffsinger, 27495 Commerce Center Dr., Temecula, CA (US) 92590

( * ) Notice: Subject to any disclaimer, the term of this patent is extended or adjusted under 35 U.S.C. 154(b) by 0 days.

(21) Appl. No.: 10/217,225

(22) Filed: Aug. 9, 2002

(65) Prior Publication Data

US 2003/0038458 A1 Feb. 27, 2003

Related U.S. Application Data

(60) Provisional application No. 60/314,220, filed on Aug. 22, 2001.

(51) Int. Cl.$^7$ ................................................. B62B 1/12
(52) U.S. Cl. ................. 280/651; 280/47.35; 280/47.19; 280/47.2; 280/639
(58) Field of Search .................. 280/651, 639, 280/47.19, 47.17, 47.18, 30, 32.5, 32.6, 47.27, 47.28, 79.11, 79.2, 79.7, 47.35, 47.2; 108/106, 96, 99, 116, 147.19, 150; 248/129, 188.1

(56) References Cited

U.S. PATENT DOCUMENTS

| 2,519,113 | A | * | 8/1950 | Cohn ............................ 280/659 |
| 2,901,262 | A | * | 8/1959 | Berlin ........................... 280/641 |
| 2,964,328 | A | * | 12/1960 | Muir ......................... 280/47.19 |
| 3,854,428 | A | | 12/1974 | Fullenkamp ................ 108/146 |
| 3,861,702 | A | * | 1/1975 | Wilson ..................... 280/33.996 |
| 4,106,590 | A | * | 8/1978 | Tarran .......................... 182/20 |
| 4,119,044 | A | | 10/1978 | Hines ............................ 108/27 |
| 4,128,252 | A | * | 12/1978 | Raniero ......................... 280/40 |
| 4,326,731 | A | | 4/1982 | Woychio et al. ............. 280/641 |
| 4,355,818 | A | * | 10/1982 | Watts .......................... 280/654 |
| 4,488,497 | A | | 12/1984 | Bevans ........................ 108/144 |
| 4,521,030 | A | * | 6/1985 | Vance ........................... 280/42 |
| 4,526,399 | A | * | 7/1985 | Holtz ........................... 280/655 |
| 4,715,573 | A | | 12/1987 | Liegel ........................... 248/129 |
| 4,863,178 | A | | 9/1989 | Friesen ...................... 280/32.6 |
| 4,922,836 | A | | 5/1990 | Damico ....................... 108/144 |
| RE33,645 | E | | 7/1991 | Coote .......................... 248/129 |
| 5,088,420 | A | * | 2/1992 | Russell ........................ 108/106 |
| 5,181,681 | A | | 1/1993 | Edwards ...................... 248/125 |
| 5,374,019 | A | | 12/1994 | Fischer ......................... 248/122 |
| 5,460,392 | A | | 10/1995 | Hansen ...................... 280/32.6 |
| 5,473,997 | A | | 12/1995 | Solomon et al. ............... 108/93 |
| D406,434 | S | | 3/1999 | Boettcher, Jr. et al. ....... D34/23 |
| 6,196,560 | B1 | * | 3/2001 | Ohlsson ......................... 280/30 |
| 6,240,856 | B1 | | 6/2001 | Paskey et al. ............... 108/146 |
| 6,267,393 | B1 | * | 7/2001 | Mengrone et al. ............ 280/37 |

FOREIGN PATENT DOCUMENTS

EP  0168158  6/1985

* cited by examiner

Primary Examiner—Brian L. Johnson
Assistant Examiner—Bridget Avery
(74) Attorney, Agent, or Firm—Calif Tervo

(57) ABSTRACT

Foldable tool cart (10) including a base (15) supporting a vertical post (71) of adjustable height, lower tool tray (100) supported by base (15), an upper tool tray (110) supported by post (71), and pivots (60, 120) for folding cart (10) such that trays (100, 110) are substantially vertical. A tool caddy (150), attached to post (71), remains upright when cart (10) is folded.

20 Claims, 4 Drawing Sheets

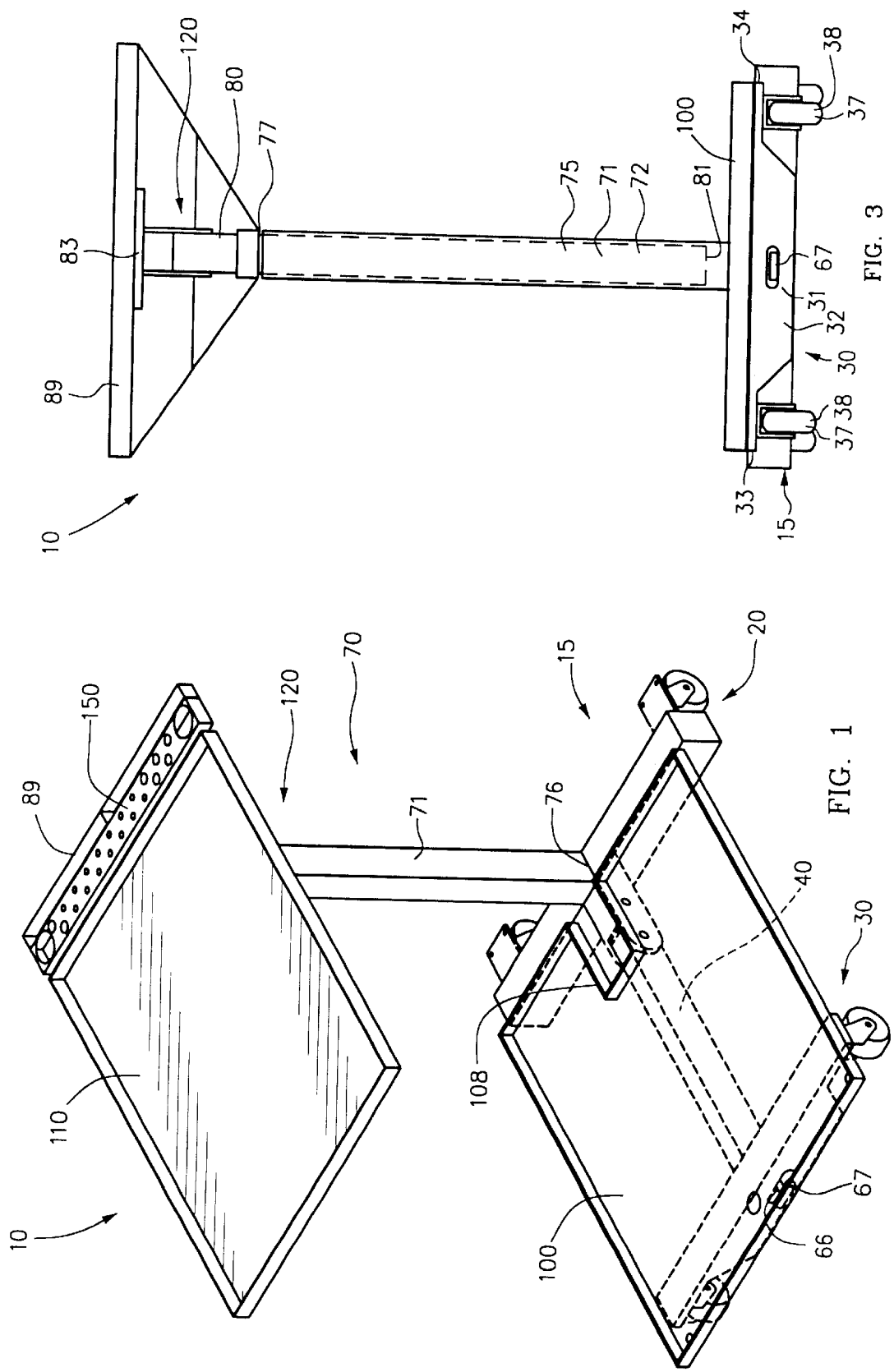

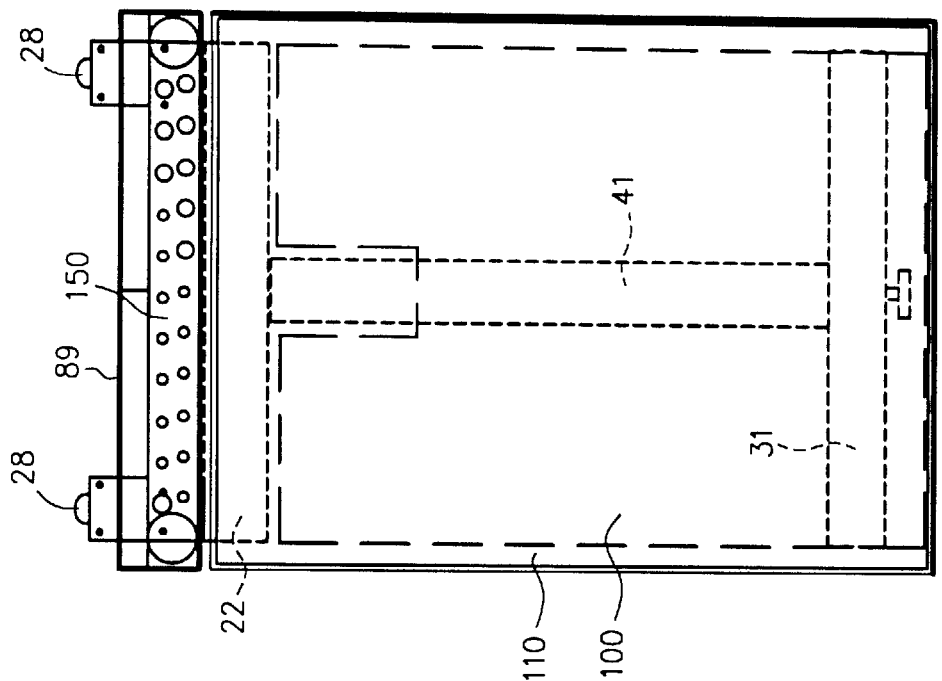
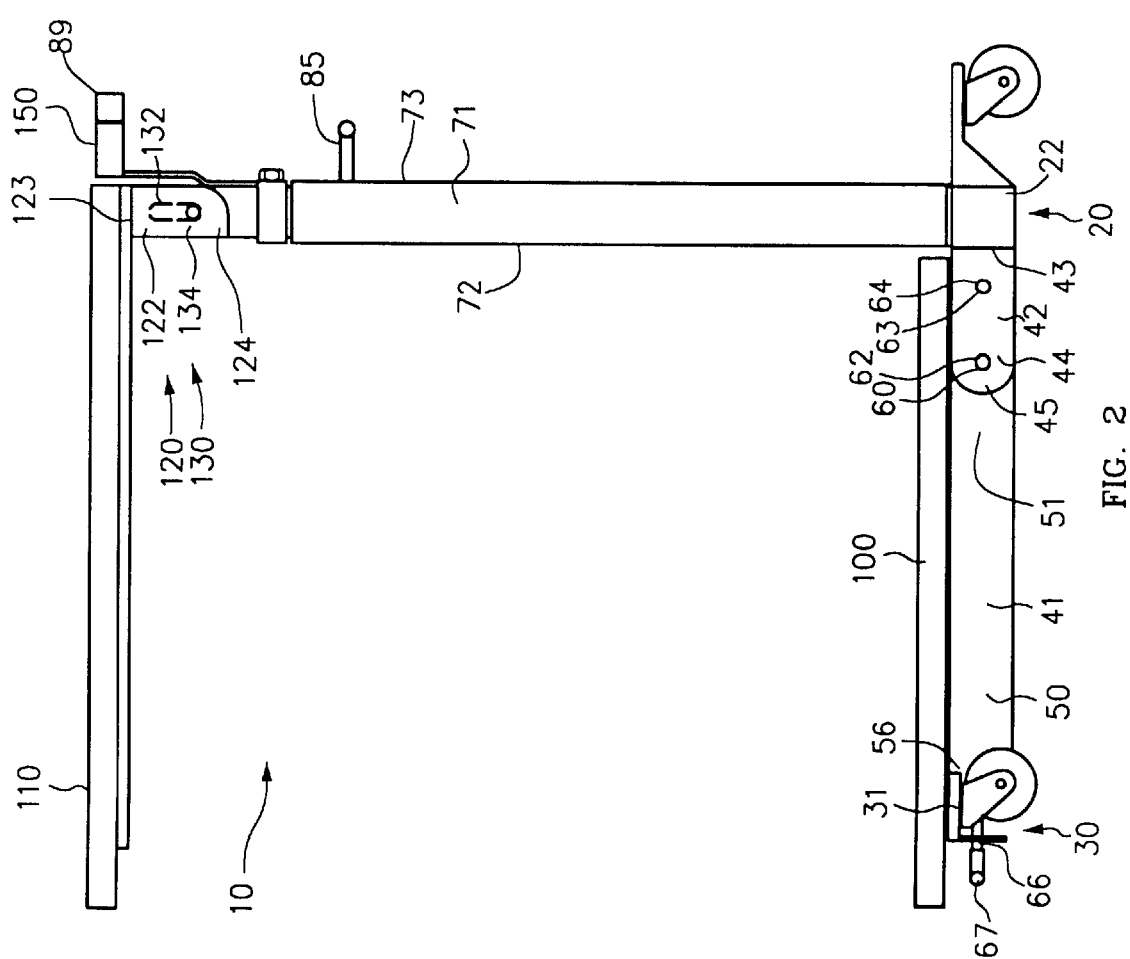

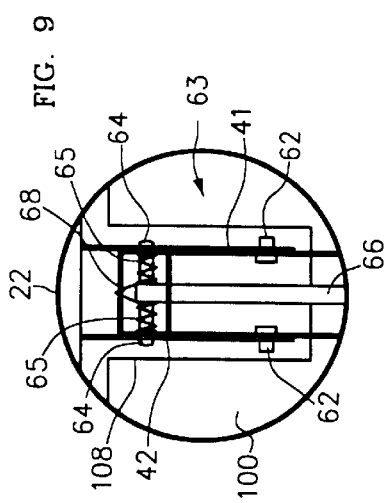
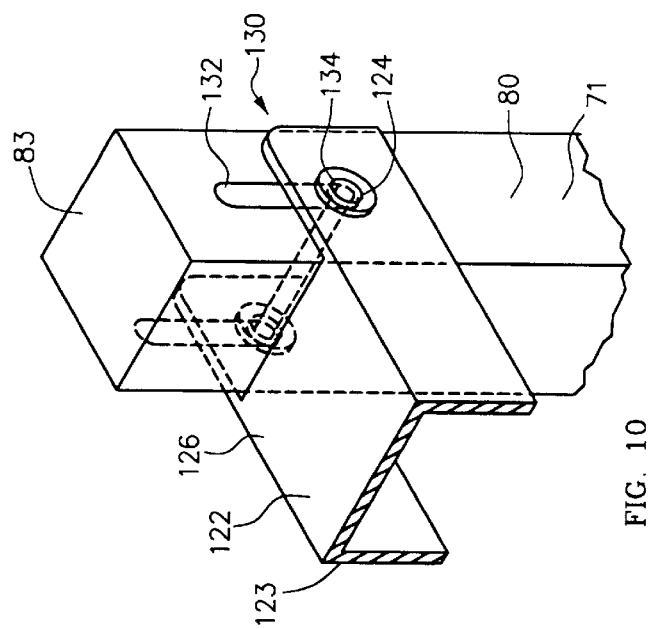
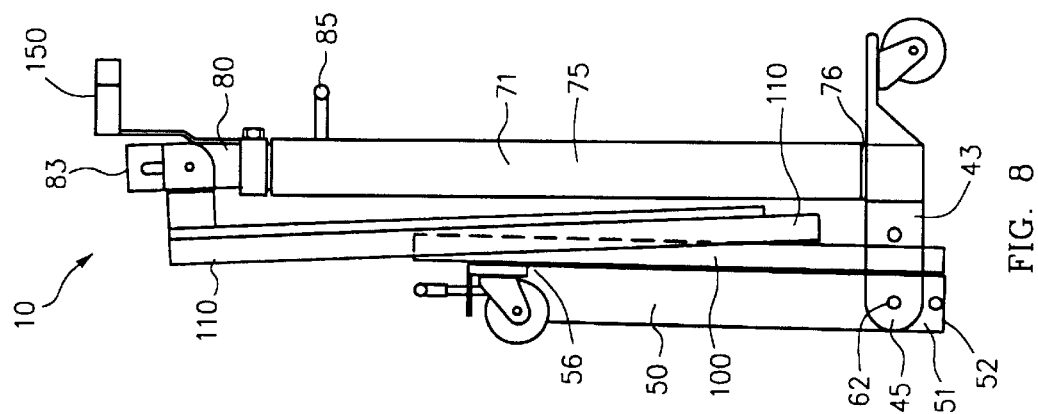
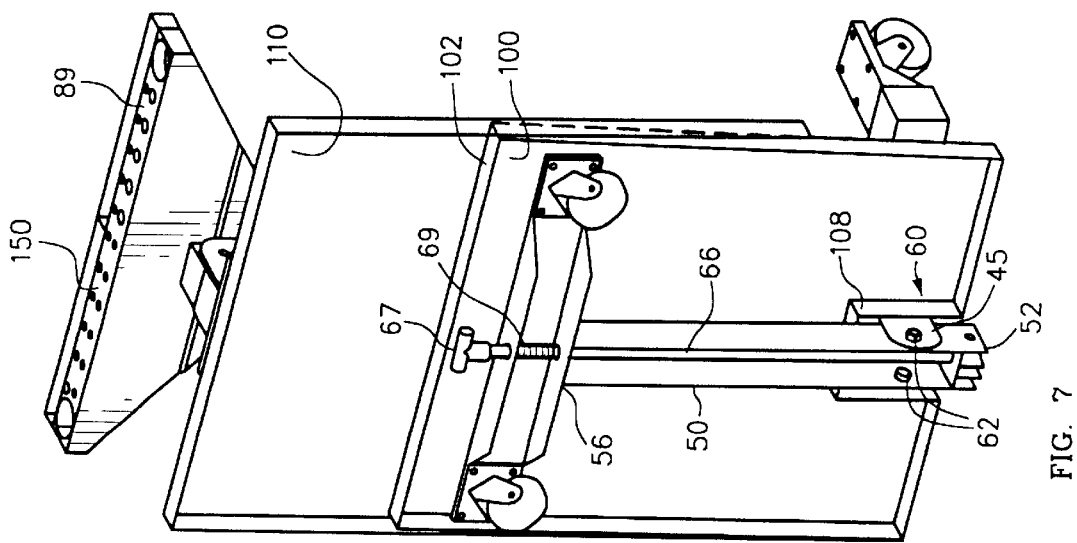

FOLDABLE TOOL CART

CROSS-REFERENCE TO RELATED APPLICATION

This application claims the benefit of U.S. Provisional Application No. 60/314,220, filed Aug. 22, 2001.

BACKGROUND OF THE INVENTION

Carts for holding tools and parts for working, for example, on a motor vehicle are well known. It is desirable that a tool cart be easily moved, have a tool tray that is supported at heights ranging from fitting under a vehicle to fitting over a fender. Particularly for the home mechanic, it is desirable that a tool cart be easily folded to a storable position, such as along side of a vehicle in the garage or at the rear of the garage.

Numerous tool carts have been proposed to satisfy one or more of these desires. However, none satisfy all of the requirements.

SUMMARY OF THE INVENTION

The invention is a foldable tool cart generally comprising a base, a vertical post of adjustable length supported by the base, a lower tool tray supported by the base, an upper tool tray supported by the post, and means for folding cart such that the trays are substantially vertical. A tool caddy, attached to the post, remains upright when the cart is folded.

The frame includes front and rear transverse members supported by swivel casters and joined by a longitudinal member that includes a pivot such that it may fold upward along with the lower tray while pivoting a foot portion downward so as to become a front support. A release rod activates the pivot.

A pivot bracket pivotly connects the upper tool tray to the top end of the post such that the upper tool tray is pivotable from an erect position, wherein the upper tool tray is horizontal and spaced above the longitudinal member, to a folded position, wherein the upper tool tray parallels the post. A pivot is movable from a lower position, wherein the post prevents the pivot from pivoting, to an upper position, wherein it may. The pivot may comprise a slot and pivot pin cooperating between the post and bracket.

Other features and many attendant advantages of the invention will become more apparent upon a reading of the following detailed description together with the drawings wherein like reference numerals refer to like parts throughout.

BRIEF DESCRIPTION OF THE DRAWINGS

FIG. 1 is a top front perspective view of an exemplary embodiment of the foldable tool cart of the invention in the erect position.

FIG. 2 is a right side elevation view thereof, the left side being a mirror image.

FIG. 3 is a front elevation view thereof.

FIG. 4 is top plan view thereof.

FIG. 7 is a top front perspective view of the cart in the folded, storage position.

FIG. 8 is a right side elevation view of the cart in the folded, storage, position.

FIG. 9 is an enlarged view of detail 9 of the folding release of FIG. 5.

FIG. 10 is a partial, top front perspective view of the tray folding mechanism.

DETAILED DESCRIPTION OF THE INVENTION

Figure 6:
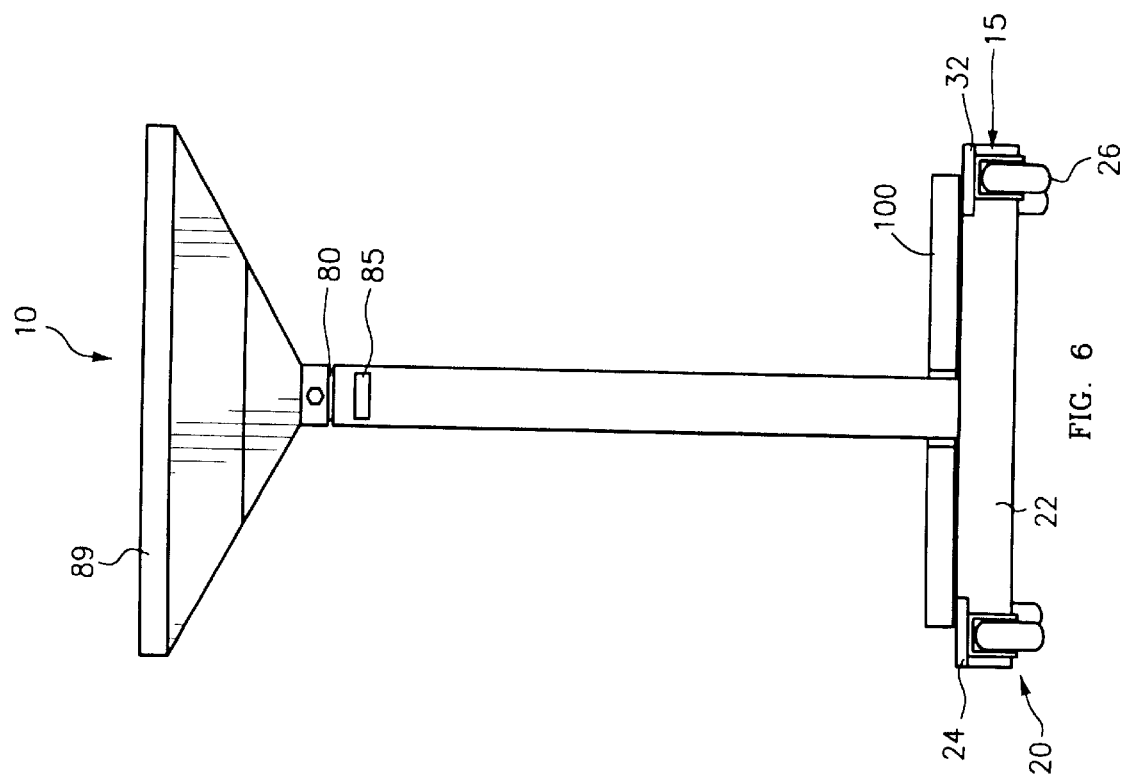
FIG. 6 is a rear elevation view thereof.
Figure 5:
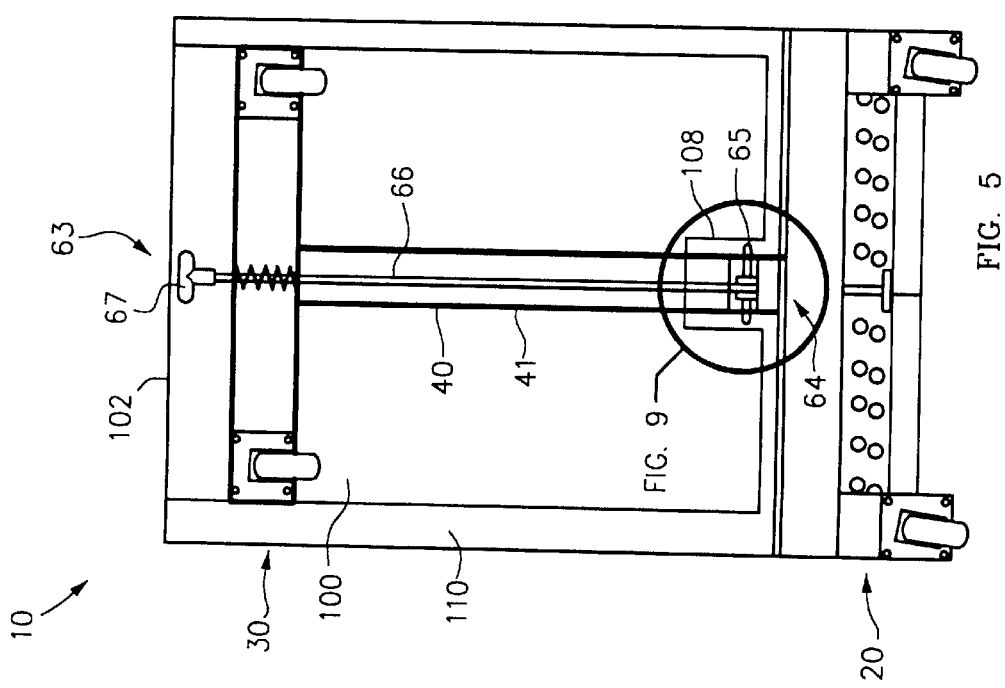
FIG. 5 is bottom plan view thereof.

With reference now to the drawings wherein FIG. 1 is a top front perspective view of an exemplary embodiment of the foldable tool cart 10 of the invention in the erect position, FIG. 2 is a right side elevation view, the left side being a mirror image, FIG. 3 is a front elevation view; FIG. 4 is top plan view, FIG. 5 is bottom plan view, and FIG. 6 is a rear elevation view.

Cart 10 generally comprises a base 15 supporting a lower tool tray 100 and a vertical assembly 70; the vertical assembly 70 supporting an upper tool tray 110.

Base 15 generally comprises a rear assembly 20, a front assembly 30, and a longitudinal assembly 40 connecting them. As best seen in FIG. 6, rear assembly 20 comprises a rear transverse member 22 including a left end 23 and a right end 24, a left roller means, such as a roller or swivel caster 26, for rollingly supporting left end 23, and right roller means, such as a roller or swivel caster 28 for rollingly supporting right end 24 such that rear transverse member 22 is off the floor. Preferably, rear casters 26, 28 provide a wide stance for stability.

As best seen in FIG. 3, front assembly 30 is longitudinally spaced from rear assembly 20 nd includes a front member 31 and front member support means 37, such as a leg, wheel or caster 38 for supporting front member 31 off the ground. Preferably, front member 31 is of substantial length, such as transverse member 32 having a left end 33 and a right end 34, both supported by support means, such as wheels or swivel casters 38. Added length provides stability for cart, 10

Looking also as FIGS. 7, 8, and 9, FIG. 7 is a top front perspective view of cart 10 in the folded storage position, FIG. 8 is a right side elevation view of cart 10 in the folded storage position, and FIG. 9 is an enlarged view of detail 9 of the folding release of FIG. 5.

Longitudinal assembly 40 generally comprises: a longitudinal member 41; a lower pivot means 60, including pivot pins 62, and a locking means 63 including locking bolts 64. Longitudinal member includes: a rear section 42 having a rear end 43 connected to rear assembly 20, such as to the middle of the front of transverse member 22; and a front end 44, and a front section 50 having a rear end 51 including a foot portion 52, and a front end 56 connected to front member 31. In the preferred embodiment, front section 50 is a channel, and rear section 42 is a slightly larger channel, both open on the bottom, such that it overlaps and fits over foot portion 52 of front section. Front end 44 of rear section 42 is a clevis 45

Lower pivot means 60, such as a pair of pivot pins 62 in clevis 45, pivotly connecting rear end 51 of front section 50 with front end 44 of rear section 42 such that front section 50 is pivotable about pins 62 from an erect position as seen in FIG. 2, wherein front section 50 is horizontal and front casters 38 are on the ground, to a folded position as seen in FIGS. 7 and 8, wherein front section 50 is generally vertical and foot portion 52 is pivoted downward so as to become a front support for cart 10. Foot portion 52 is to the rear of pivot pins 62.

As best seen in FIGS. 5 and 9, locking means 63,selectively movable from a locking position locking front section 50 in the erect position to an unlock position wherein front section 50 may fold, includes locking bolts 64 mounted in longitudinal member 4. Locking bolts 64 are movable from an outward locking position, wherein each has an outer end disposed through bores in both rear section 42 and front section 50 of longitudinal member 41 so as to lock longitudinal member 41 in the erect position, to an inward unlock position. Springs 65 inwardly bias each bolt 64 to the unlock position.

An elongate release rod 66 is mounted in base 15, such as in longitudinal member 41; preferably, such that handle 67 is in front of front assembly 30 so as to be easily accessible by a user. Rod 66 includes release means, such as rear end 68, adapted for interaction with locking bolts 64. Rod 66 is selectively movable longitudinally forward by a user from a locking position, wherein rod 66 is between locking bolts 64 so as to hold them in the locked position, to a release position, wherein end 68 does not hold bolts 64 in the lock position such that bias springs 65 move bolts 64 inward to the unlock position. Biasing means, such as spring 69, biases rod 66 to the lock position. To fold longitudinal member 41, the user simply pulls forward on handle 67 and lifts. Lower tool tray 100 is adapted, such as having cut out 108 and not being above rear transverse member 22, to fold with longitudinal member 41. In the folded position, foot portion 52 acts as a third leg and holds cart 10 upright and functions as a brake or stop so that cart 10 will not roll when stored.

Vertical assembly 70 includes an upright post 71 having a front side 72, a rear side 73, bottom end 76 supported by rear assembly 20, such as by the middle of rear transverse member 22, and a top end 83. Post 71 is of adjustable height and includes an upper portion 80 slidingly fitting in lower portion 75. A large handled set screw 85, threadably mounted, such as to a nut, on lower portion 75, serves as height adjustment means and can be brought to bear against upper portion 80 to hold it at a desired height. Lower portion 75 has a bottom end 76 and a free open top end 77. Upper portion 80 has a bottom end 81 disposed inside lower portion 75.

FIG. 10 is a partial, top front perspective view of the folding mechanism for upper tool tray 110. Upper tool tray 110 is pivotly connected to top end 83 of post 71 by an upper pivot means 120 such that said upper tool tray 110 is pivotable from an erect position, wherein upper tool tray 110 is horizontal and spaced above longitudinal member 41, to a folded position, wherein upper tool tray 110 parallels post 71. Upper pivot means 120 includes an upper pivot 130 movable from a lower position, wherein post 71 prevents pivot 130 from pivoting and upper tool tray 110 is held in the erect position, to an upper position, wherein pivot 130 may pivot upper tool tray 110 to the folded position. A pivot bracket 122 has a first end 123 connected to upper tool tray 110 and a second end 124 mounted on top end 83 of post 71. Bracket 122 includes a retaining member 126 bearing against post 71 when pivot 130 is in the lower position such that pivot 130 cannot pivot upper tool tray 110 to the folded position. In the preferred embodiment, upper pivot means 120 includes slot 132 and pivot pin 134 cooperating between post 71 and bracket 122. Lower tool tray 100 is slightly narrower than upper tool tray 110 such that, in the folded position, lower tool tray front end 102 fits inside upper tool tray 110. In this manner, upper tool tray 110 is erected and folded simply by the user picking it up and rotating it.

A tool caddy 150 is attached to upper portion 80 of post 71 and moves up and down with upper portion 80. Caddy 150 includes means, such as apertures and hooks for holding a plurality of tools. Caddy 150 remains upright when cart 10 is folded so that tools stored thereon do not need to be removed. A rear handle 89 is connected to post 71, such as to upper portion 80 so as to move along with any height adjustment. In the preferred embodiment, rear handle 89 is attached to rear of tool caddy 150.

FIGS. 7 and 8 show cart 10 in the folded storage position. It can be seen that folded cart 10 can be easily stored in a small space, such as along side a car in a garage or at the rear of the garage. Foot 52 holds cart 10 upright and prevent cart 10 from rolling.

Although a particular embodiment of the invention has been illustrated and described, various changes may be made in the form, composition, construction, and arrangement of the parts herein without sacrificing any of its advantages. Therefore, it is to be understood that all matter herein is to be interpreted as illustrative and not in any limiting sense, and it is intended to cover in the appended claims such modifications as come within the true spirit and scope of the invention

I claim:

1. A foldable tool cart comprising:
 a base comprising:
  a rear assembly comprising;
   a rear transverse member including:
    a left end; and
    a right end; and
   left roller means for rollingly supporting said left end of said rear transverse member; and
   right roller means for rollingly supporting said right end of said rear transverse member; and
  a front assembly, longitudinally spaced from said rear assembly, comprising:
   front assembly support means for supporting said front assembly; and
  a longitudinal assembly comprising:
   a longitudinal member:
    a rear mount including:
     a rear end connected to said rear assembly; and
     a front end, and
    a front section including;
     a rear end including:
      a foot portion; and
     a front end connected to said front assembly;
    lower pivot means pivotly connecting said rear end of said front section with said front end of said rear mount such that said front section is pivotable from an erect position, wherein said front section is horizontal and said front assembly support means is on the ground, to a folded position, wherein said front section is generally vertical and said foot portion is pivoted downward so as to become a front support member; and
    locking means selectively movable from a locking position locking said front section in the erect position to an unlock position;
 a vertical assembly including:
  a generally upright post including:
   a front side;
   a rear side;
   a bottom end supported by said rear assembly; and
   a top end;
 an upper tool tray; and
 upper pivot means for pivotly connecting said upper tool tray to said top end of said post such that said upper tool tray is pivotable from an erect position, wherein said upper tool tray is horizontal and spaced above said longitudinal member, to a folded position, wherein said upper tool tray parallels said post.

2. The foldable tool cart of claim 1 further including:
a lower tool tray supported by said longitudinal member.
3. The foldable tool cart of claim 1 wherein:
said locking means includes:
   a rod supported by said base and selectively movable by a user from a locking position, wherein said front section is locked in the erect position, to a release position, wherein said front section is not locked.
4. The foldable tool cart of claim 1 wherein:
said locking means includes:
   a locking bolt movable from a locked position contacting said front section and said rear mount and locking said front section in the erect position to an unlocked position not locking said front section.
5. The foldable tool cart of claim 1 wherein:
said front assembly support means includes a roller.
6. The foldable tool cart of claim 1 wherein:
said front assembly includes:
   a front transverse member including:
      a left end; and
      a right end, and
   left support means for supporting said left end of said front transverse member above a floor; and
   right support means for supporting said right end of said front transverse member above a floor.
7. The foldable tool cart of claim 3 wherein:
said rod includes:
   a handle located in front of said front assembly.
8. The foldable tool cart of claim 4 wherein:
said locking means includes:
   a rod supported by said base including
      a handle; and
      release means adapted for interaction with said locking bolt, said rod selectively movable by a user from a locking position, wherein said locking bolt is held in the locked position, to a release position, wherein said locking bolt is moved to the unlock position.
9. The foldable tool cart of claim 6 wherein:
said left support means includes:
   a roller for supporting said left end of said front transverse member above a floor; and
said right support means includes:
   a roller for supporting said left end of said front transverse member above a floor.
10. A foldable tool cart comprising:
a base comprising:
   a rear assembly comprising;
      a rear transverse member including:
         a left end; and
         a right end; and
      left roller means for rollingly supporting said left end of said rear transverse member; and
      right roller means for rollingly supporting said right end of said rear transverse member; and
   a front assembly, longitudinally spaced from said rear assembly, comprising:
      front assembly support means for supporting said front assembly; and
   a longitudinal assembly comprising:
      a longitudinal member:
         a rear mount including:
            a rear end connected to said rear assembly; and
            a front end; and
         a front section including;
            a rear end including:
               a foot portion; and
            a front end connected to said front assembly,
      lower pivot means pivotly connecting said rear end of said front section with said front end of said rear mount such that said front section is pivotable from an erect position, wherein said front section is horizontal and said front assembly support means is on the ground, to a folded position, wherein said front section is generally vertical and said foot portion is pivoted downward so as to become a front support member; and
      locking means selectively movable from a locking position locking said front section in the erect position to an unlock position; and
a vertical assembly including:
   a generally upright post including:
      a front side;
      a rear side;
      a bottom end supported by said rear assembly; and
      a top end;
an upper tool tray; and
   upper pivot means for pivotly connecting said upper tool tray to said top end of said post; said upper pivot means including:
      a pivot movable from a lower position, wherein said post prevents said pivot from pivoting and said upper tool tray is held in an erect position, wherein said upper tray is horizontal and spaced above said longitudinal member, to an upper position, wherein said pivot may pivot said upper tray to a folded position, wherein said upper tool tray parallels said post.
11. The foldable tool cart of claim 10 wherein:
said vertical assembly includes:
   a tool caddy attached to upper portion of post including means for holding a plurality of tools.
12. The foldable tool cart of claim 10 further including:
a lower tool tray supported by said longitudinal member.
13. The foldable tool cart of claim 10 wherein:
said upper pivot means includes:
   a pivot bracket including:
      a first end connected to said upper tool tray, and
      a second end mounted on said post.
14. The foldable tool cart of claim 10 wherein:
said front assembly support means includes a roller.
15. The foldable tool cart of claim 10 wherein:
said front assembly includes:
   a front transverse member including:
      a left end; and
      a right end; and
   left support means for supporting said left end of said front transverse member above a floor; and
   right support means for supporting said right end of said front transverse member above a floor.

16. The foldable tool cart of claim 13 wherein:

said bracket includes:
   a retaining against said post when said pivot is in the lower position such that said pivot cannot pivot said upper tray to the folded position.

17. The foldable tool cart of claim 13 wherein:

said upper pivot means includes:
   a cooperative slot and pivot pin in said post and said bracket.

18. The foldable tool cart of claim 15 wherein:

said left support means includes:
   a roller for supporting said left end of said front transverse member above a floor; and said right support means includes:
   a roller for supporting said left end of said front transverse member above a floor.

19. The foldable tool cart of claim 17 further including:

a lower tool tray supported by said longitudinal member.

20. The foldable tool cart of claim 19 wherein:

said bracket includes:
   a retaining member bearing against said post when said pivot is in the lower position such that said pivot cannot pivot said upper tray to the folded position.

* * * * *